April 11, 1944.　　　　A. J. PEDIGO　　　　2,346,184
REFRIGERATING APPARATUS
Filed May 1, 1941　　　　5 Sheets-Sheet 1
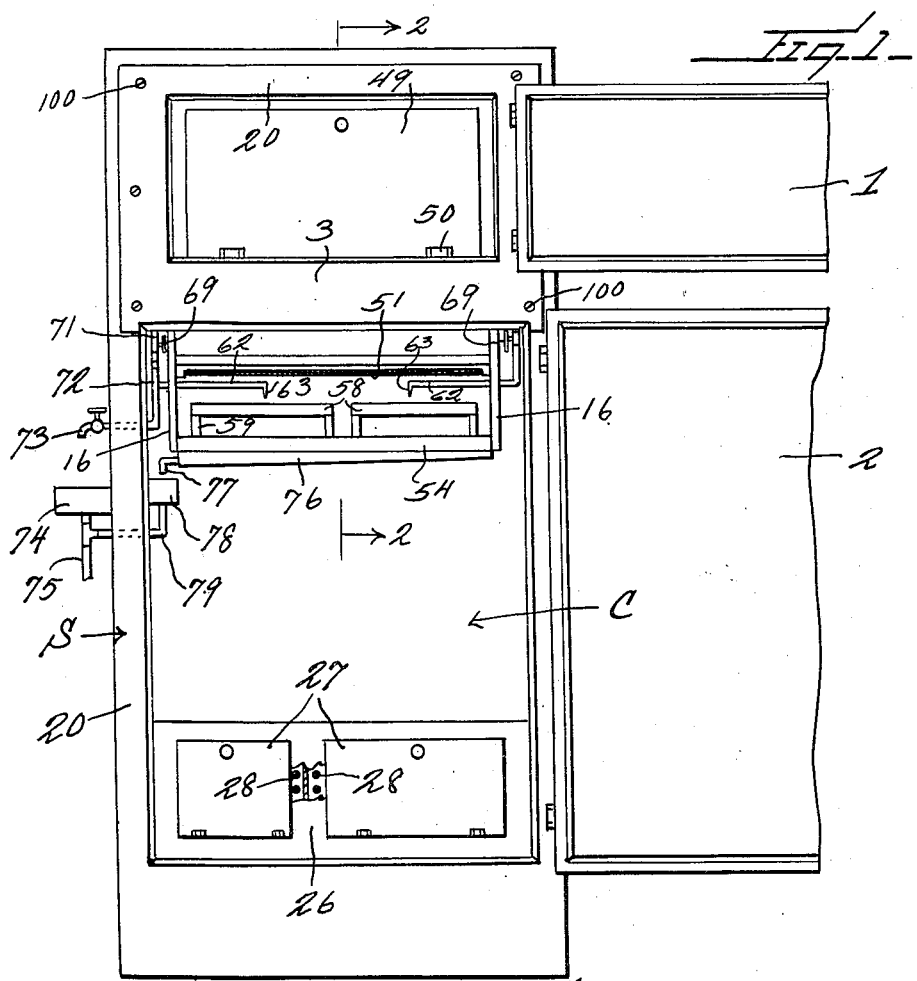
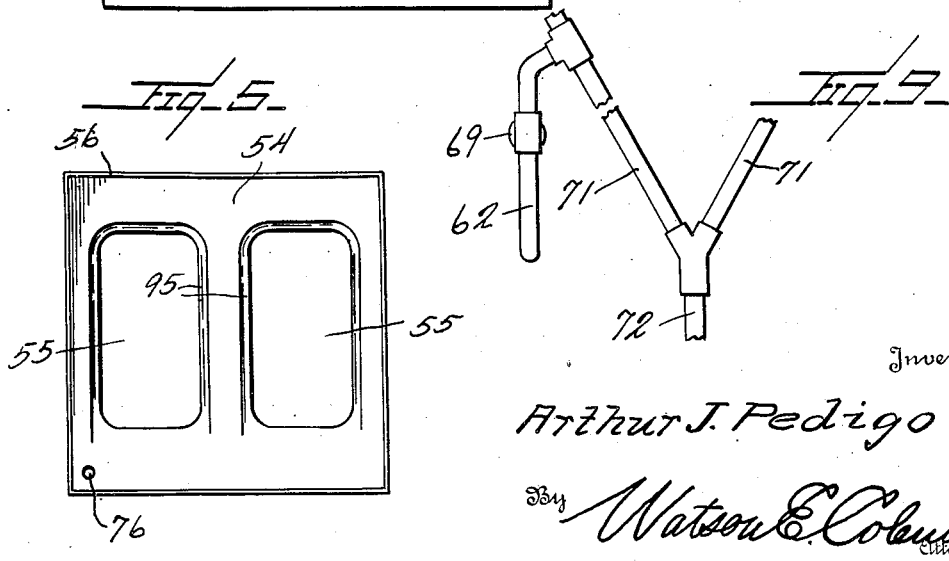
Inventor
Arthur J. Pedigo
By Watson E. Coleman
Attorney April 11, 1944.  A. J. PEDIGO  2,346,184
REFRIGERATING APPARATUS
Filed May 1, 1941  5 Sheets-Sheet 2
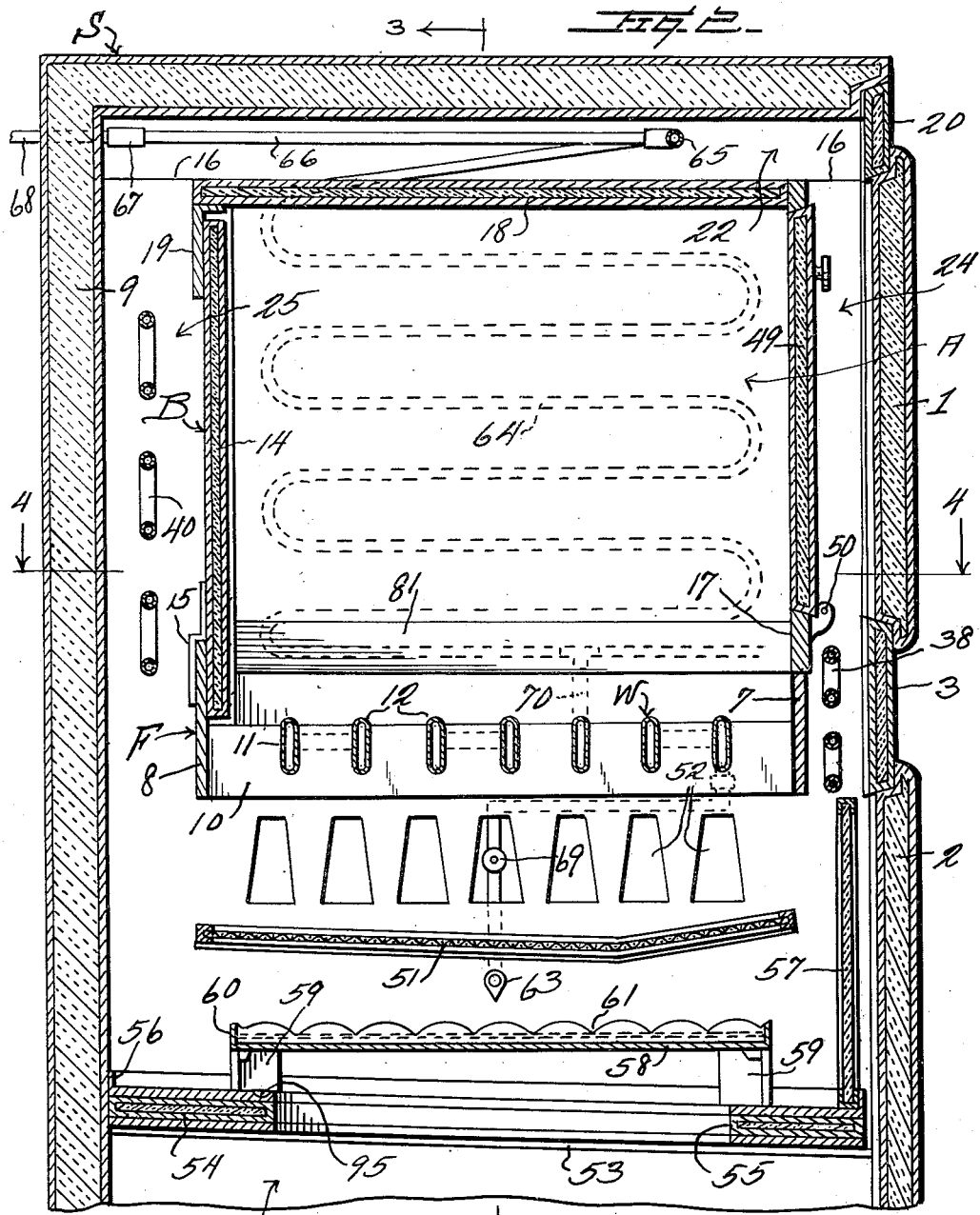
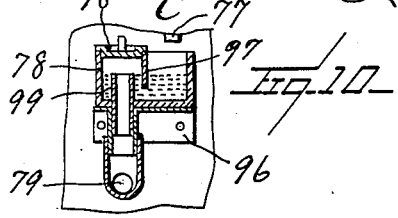
Inventor
Arthur J. Pedigo
By Watson E. Coleman
Attorney April 11, 1944.  A. J. PEDIGO  2,346,184
REFRIGERATING APPARATUS
Filed May 1, 1941  5 Sheets-Sheet 3
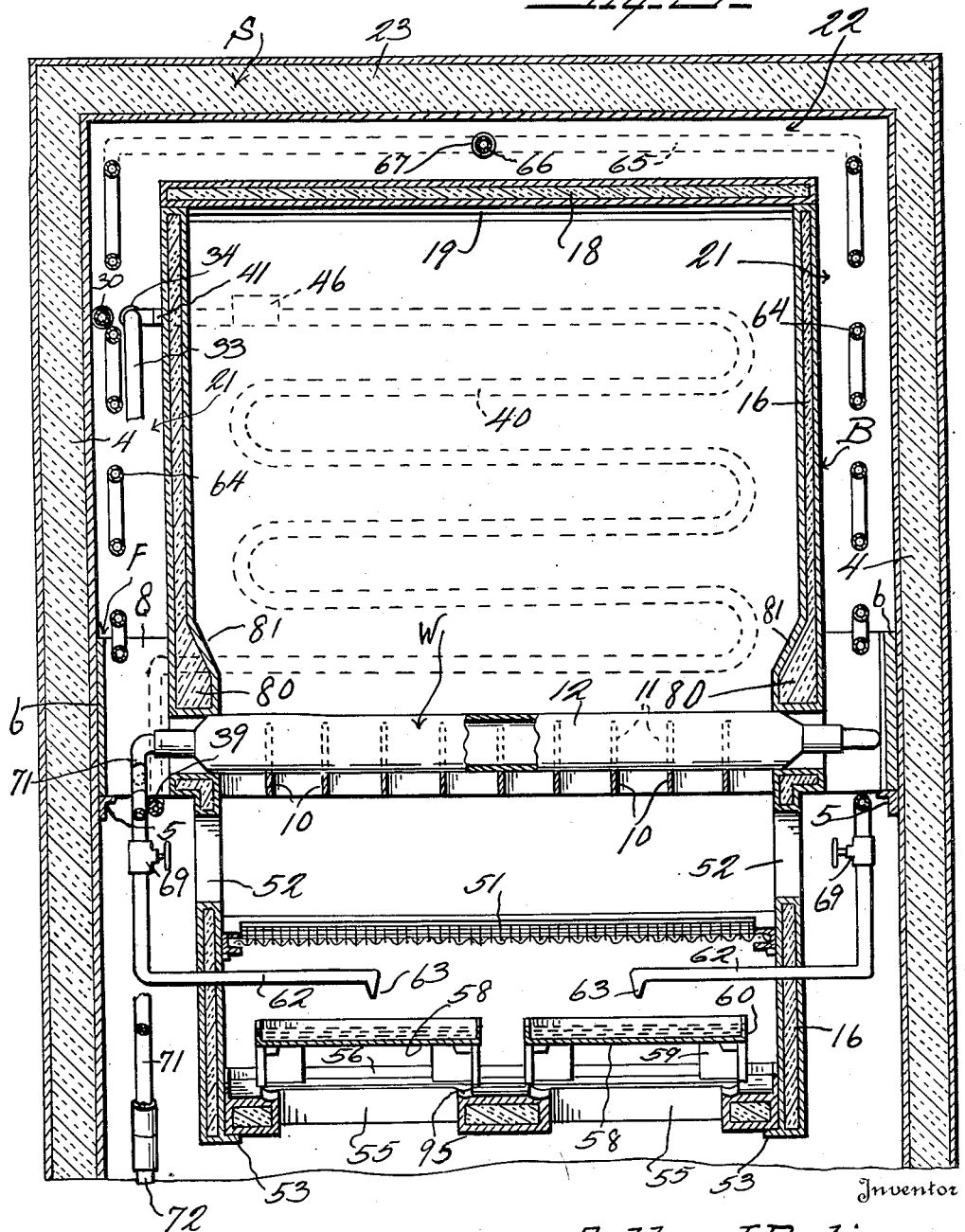

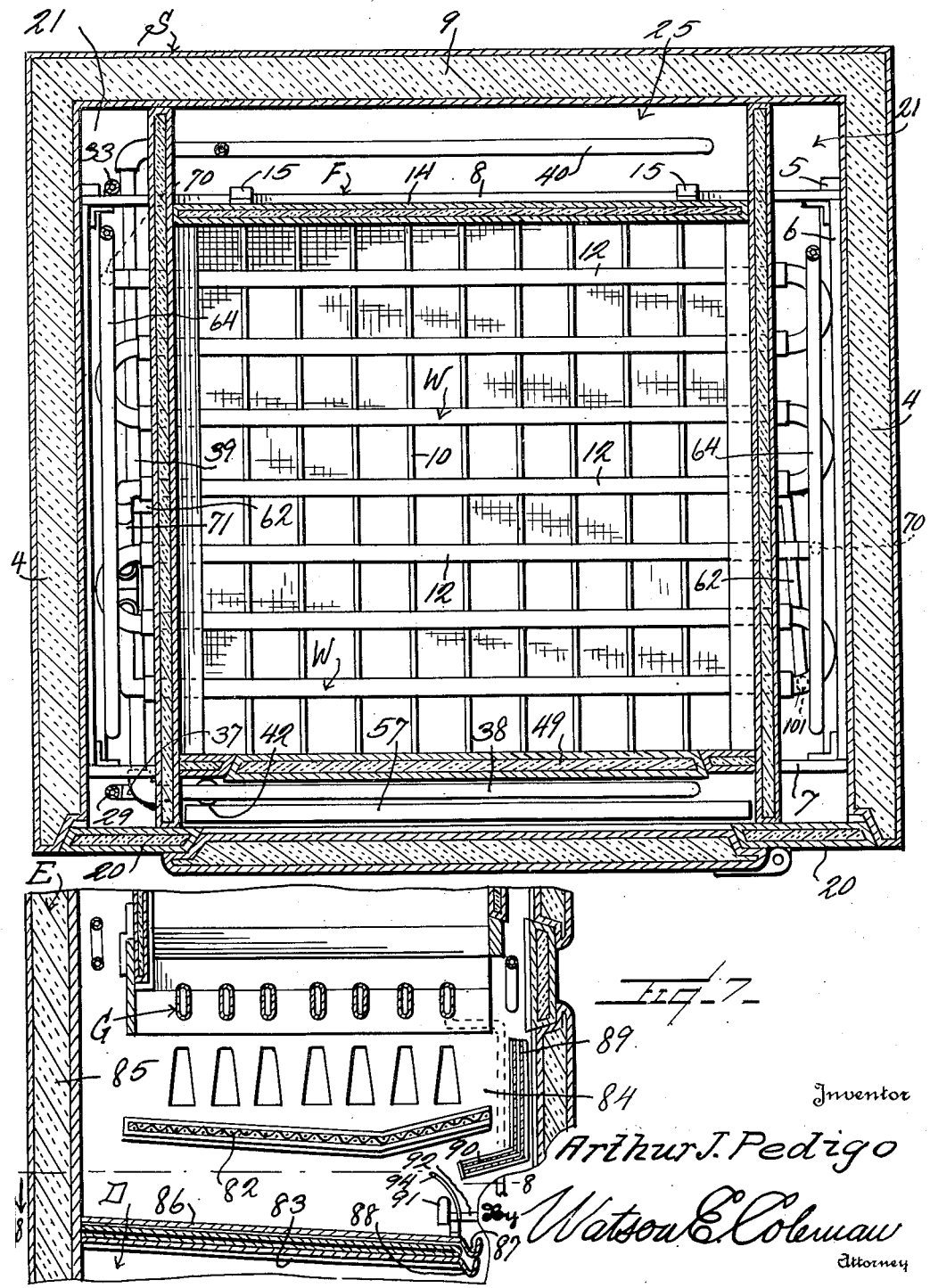

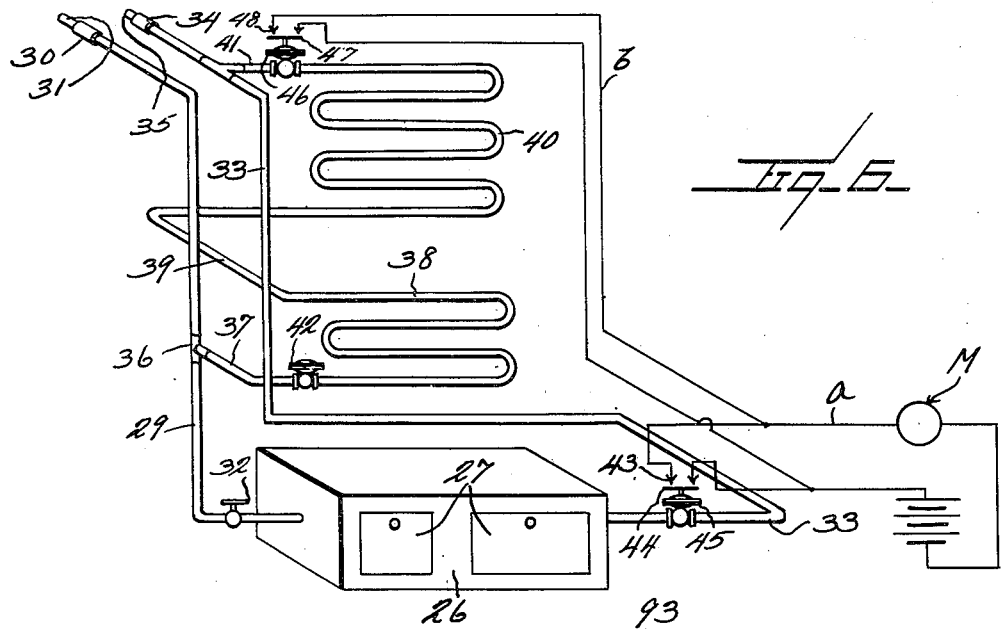
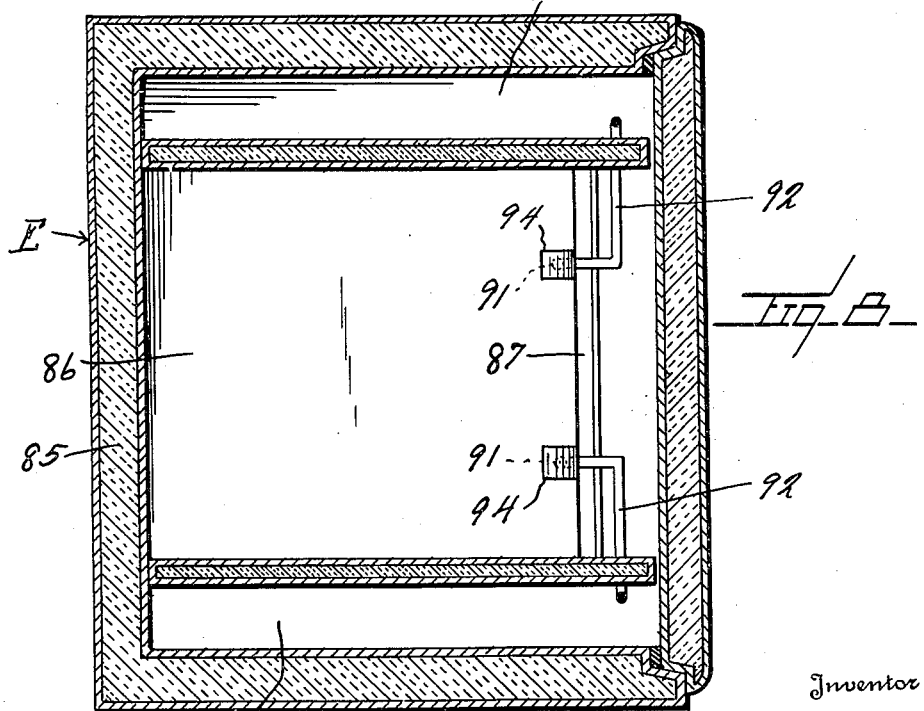

Patented Apr. 11, 1944

2,346,184

UNITED STATES PATENT OFFICE 2,346,184

REFRIGERATING APPARATUS

Arthur J. Pedigo, Cookeville, Tenn.

Application May 1, 1941, Serial No. 391,429
In Canada April 15, 1941

10 Claims. (Cl. 62—89)

This invention relates to a refrigerating apparatus, and it is an object of the invention to provide an apparatus of this kind which employs both melting ice and a mechanical refrigerating unit and wherein the mechanical unit carries the greater portion of the refrigerating load so that the icing periods are of considerable duration and generally of a period between a week and ten days or even longer.

A further object of the invention is to provide an apparatus of this kind including the use of melting ice together with mechanical refrigeration, the arrangement and assembly of the various parts being such that the melting ice provides an effective stabilizing medium for both temperature and humidity and, furthermore, serves to supply any deficiency of refrigeration when the demands for refrigeration may be heavy.

An additional object of the invention is to provide an apparatus of this kind wherein the melting ice is supported in a manner to provide an effective washing of the air circulating within the food chamber, thus freeing the food chamber from such odors, bacteria or the like which may emanate from the foods within the food chamber.

The invention also has for an object to provide an apparatus of this kind comprising a shell or casing of any preferred construction in which the various elements comprised in the refrigerating assembly can be readily and conveniently applied or removed when desired.

The invention has for a further object the provision of means whereby water may be cooled for drinking purposes and in a manner whereby such water at no time becomes contaminated.

A still further object of the invention is to provide an apparatus of this kind wherein the freezing units are in the bottom portion of the food chamber.

The invention also contemplates as an object to provide means for adding moisture to the upper portion of the food chamber of the apparatus, as by a drip-baffle or with a spray, to purify the air, the delivery of the added moisture being effected in a manner to maintain a constant circulation through the grid of the apparatus upon which the ice is placed to prevent freezing of the water within the grid and thus eliminate interference with the drawing off of drinking water which passes through the grid to be cooled.

The invention consists in the details of construction and in the combination and arrangement of the several parts of my improved refrigerating apparatus, whereby certain important advantages are attained, as will be hereinafter more fully set forth.

In order that my invention may be the better understood, I will now proceed to describe the same with reference to the accompanying drawings, wherein—

Figure 1 is a view in front elevation of a refrigerating apparatus constructed in accordance with an embodiment of my invention, the doors being shown in fragment and in substantially fully opened position.

Figure 2 is an enlarged detail vertical sectional view taken substantially on the line 2—2 of Figure 1.

Figure 3 is a vertical sectional view taken substantially on the line 3—3 of Figure 2.

Figure 4 is a horizontal sectional view taken substantially on the line 4—4 of Figure 2.

Figure 5 is a view in top plan of the pan comprised in the humidifying structure, as herein comprised, said pan being unapplied.

Figure 6 is a diagrammatic view of the coil assembly as herein comprised and the automatic control thereby of the motor for the mechanical refrigerating assembly.

Figure 7 is a fragmentary detailed vertical sectional view illustrating another embodiment of my invention.

Figure 8 is a horizontal sectional view taken substantially on the line 8—8 of Figure 7.

Figure 9 is a fragmentary view showing the connection between the terminals of the water coils with a common discharge pipe.

Figure 10 is a fragmentary view partly in elevation and partly in section illustrating the trap associated with the cold water discharge line.

In the accompanying drawings, the apparatus illustrated is designed particularly for domestic use, but it is to be pointed out that the apparatus may be constructed for other uses, such as a walk-in ice box as used in stores or the like.

As disclosed in the accompanying drawings, S denotes a shell or casing of desired dimensions and constructed in a conventional manner to provide the required insulation. This shell or casing has one face open and with which open face coacts the swinging doors 1 and 2, the upper door 1 permitting access within the upper portion of the shell or casing, while the lower door 2 permits access to the food chamber.

Bridging the open face of the shell or casing S and disposed transversely thereof is a cross member or sill 3. This member or sill 3 is interposed between the doors 1 and 2 and coacts with said doors in a well known manner.

The side walls 4 are provided thereacross with the inwardly disposed ledges 5 upon which engages from above the side members 6 of a frame F. The ledges 5 are so positioned as to place the frame F substantially co-planar with the cross member or sill 3. As herein disclosed, this frame F is rectangular in form. This frame F has its side members 6 in close contact with the inner faces of the side wall 4 but said arms 6 are of a length to have the front member 7 spaced inwardly from the sill 3 and its rear member 8 spaced from the rear wall 9 of the shell or casing S.

Interposed between the lower portions of the front members 7 and the rear member 8 of the frame F are the strips or flat members 10. These members 10 extend a partial distance upwardly from the bottom edges of the frame F and may be welded or otherwise rigidly secured to the members 7 and 8. The upper marginal portions of these strips or members 10 are provided with the spaced recesses 11 in which are received the parallel straight portions 12 of the water coils W. These coils W are preferably of copper.

The straight portions 12 of the coils are flattened, as is clearly illustrated in Figure 2 of the drawings, and the upper margins of these portions 12 as herein disclosed extend a slight distance above the upper edges of the strips or members 10. It is to be particularly noted that the flattened faces of the portions 12 of the coils W are vertically disposed.

The members or strips 10, together with the straight portions 12 of the coils W, provide a supporting grid structure for an ice block when placed within the ice compartment or chamber A within the box B. The bottom of the box B is open and the remaining walls are of a suitable insulated structure. The rear wall 14 of the box B is provided at its lower part with the downwardly facing brackets 15 which engage over the rear member 8 of the frame F whereby said rear wall 14 may be removably supported between the side walls 16 for the box. This rear wall 14 is interposed between the side walls 16 as is the front wall 17. The front wall 17, as illustrated in Figure 2, rests from above upon the front member 7 of the frame F and for which reason this front member 7 is of a width or height less than that of the rear member 8 sufficient to assure the box B being properly supported within the upper portion of the shell or casing. It is also to be noted that the lower portion of the applied rear wall 14 extends downwardly within the frame F and in close contact with the rear member 8 thereof.

The rear marginal portion of the top wall 18 for the box B has extending thereacross a depending flange or strip 19 with which the upper marginal portion of the applied rear wall 14 overlaps and contacts.

The side walls 16 for the box B extend forwardly and rearwardly to snugly bridge the space between the vertical marginal portions of the front wall 20 and the rear wall 9 of the shell or casing. These side walls 16 also extend from the top surface of the box B to points considerably below the ledges 5.

In the present embodiment of my invention, the frame F is sectional so that the members 7 and 8 of the frame may be readily passed through the side walls 16 whereby the box B is further maintained in applied position. The side walls 16 are spaced from the adjacent upper portions of the side walls 4 of the shell or casing S to provide side flues 21 opening at their lower ends into the food compartment of the shell or casing S and having their upper ends opening within the space 22 between the top wall 18 of the box B and the top wall 23 of the shell or casing S.

The mounting of the box B provides between the side walls 16 thereof, a front vertically disposed flue 24 and a rearwardly vertically disposed flue 25 each opening into the top space 22 and into the space between the portions of the side wall 16 below the frame F.

Resting upon the bottom surface or floor of the food chamber or compartment C are the freezing units 26. The entrance to each of these units 26 is adapted to be normally closed by a door 27. Within these units 26 are the conventional freezing coils 28. In communication with the induction end of the coils 26 is a suitably directed pipe line 29, herein disclosed as extending within the flue 21, and detachably coupled, as at 30, to the pipe line 31 extending through the rear wall 9 of the shell or casing S. This pipe 31 leads to the condenser comprised in the refrigerating system. Interposed within this pipe line 29 is a hand operated valve 32 for regulating the flow into the coils 28. Leading from the eduction end of the coils 28 is a pipe line 33 which also extends up within the flue 21 and detachably connected, as at 34, to the usual liquid or expansion line 35 leading from the condenser of the mechanical refrigerator system. This expansion line 35 in the present embodiment of my invention is also disposed through the rear wall 9 of the shell or casing S.

In communication, as at 36, with the line 29 is a pipe line 37 leading to a desired designed absorption coil 38 which is positioned within the lower portion of the front flue 24 and preferably between the cross member or sill 3 and the front member 7 of the frame F so that said coil 38 will be arranged between the openings for the doors 1 and 2.

Leading from the eduction end of the coil 38 is a suitably directed pipe line 39 which is in communication with the induction end of a second absorption coil 40. This coil 40 is positioned within the rear flue 25 and directly behind the removable rear wall 14 of the box B. Leading from the eduction end of the coil 40 is a suitably directed pipe line 41 communicating with the pipe line 33.

Interposed in the line 37 in advance of the coil 38 is a thermostatically operated valve 42. This valve may be of any type or construction preferred, it only being required that such valve be of a type to close or open the flow through the pipe line 37 upon predetermined temperatures within the shell or casing S so that the coils 38 and 40 will be ineffective when the temperature within the case or shell is below a predetermined degree, and vice versa.

In the diagrammatic disclosure in Figure 6, M indicates the motor for operating the compressor and interposed in the operating circuit $a$ for the motor M is a switch structure illustrated in Figure 6 as comprising two spaced contacts 43 adapted to be bridged by the movable contact 44. This movable contact 44 is moved into closed or open position by a thermostatic operator 45 carried by the pipe line 33. When the temperature rises above a predetermined degree the operator 45 will move the contact 44 into open position and, of course, upon the temperature lowering below such degree this operator 45 will move the contact 44 into bridging engagement with the contacts 43.

Carried by the line 41 leading from the rear coil 40 is a thermostatic operator 64 for the movable contact member 47 which, when in effective position, bridges the space between the contact members 48. These spaced contact members 48 are comprised in the circuit *b* connected in parallel with the circuit *a*. It is to be noted that the circuits *a* and *b* are such that with either of the contacts 44 or 47 moving into closed position, the motor M will operate but the motor will not stop until after both of the contact members 44 and 47 have moved into open position.

The front wall 17 of the box B is provided with an opening of a size to permit a block of ice to be placed within the box B and upon the grid bottom for the box as comprised in the portions 12 of the water coils W and the members 10. This front opening is normally closed by a door 49. In the present embodiment of the invention, this door 49 has its lower marginal portion hingedly connected, as at 50, to the lower portion of the wall 17 so that said door 49 when swung down into open position will readily swing out through the opening for the door 1. When this door 49 is in its lowered or open position it will also have contact with the upper margin of the cross member or sill 3 and thereby provide a platform to facilitate the placing of the ice block within the box B.

In the course of time, the lower portion of an ice block within the box B will melt in a manner to permit the ice block to extend down through the grid bottom of the box resulting in the formation of lower ice columns depending from the ice block proper whereby is provided an increased ice surface to be contacted by the air circulating within the shell or casing S. The heat from the foodstuffs placed within the food chamber C will result in effective circulation of air within said food chamber and also through the flues 21, 24 and 25, and through the top space 22.

The ice block within the box B, as has been found in practice, will last for a considerable period of time as, for example, a week or ten days, although it will be possible for it to last for a longer period of time. The major load of refrigeration is, of course, carried by the mechanical unit but the regulation of the temperature and humidity within the food chamber C will depend upon the control of the mechanical unit. The lower the temperature within the box B, the slower melting of the ice with, of course, a corresponding reduction in humidity. Upon raising of the temperature within the box B, the greater the melting action of the ice block with increased humidity. The desired lowering or raising of the temperature within the box B may be readily effected by the conventional regulation of the mechanical unit.

Underlying the frame F and interposed between and suitably supported by the side walls 16 of the box B at a desired distance below the frame F is a perforated plate 51, herein disclosed as a mesh fabric of desired gauge. This plate 51 is of a length substantially co-extensive with the distance between the members 7 and 8 of the frame F. As the ice block within the box B melts down through the grid bottom, the length or extent of the resultant ice columns will be limited by contact of the column with this plate 51.

To further facilitate the circulation of air through the depending ice columns and particularly from the side flues 21, each of the side walls 16 between the frame F and the plate 51 is provided with a series of relatively large openings 52.

The side walls 16 terminate a material distance below the plate 51 and the lower margins of these side walls 16 are provided with the inwardly disposed ledges 53 which provide means for supporting a baffle plate 54, herein disclosed as of an insulated type. This baffle plate 54 abuts the rear wall 9 and has its front margin terminating closely adjacent to the front of the shell or casing S. As is illustrated in Figure 2 of the drawings, this baffle plate 54 is disposed downwardly on a predetermined incline from the rear wall 9 of the shell or casing.

The central portion of the plate 54 is provided therethrough with two large openings 55 through which the air is adapted to circulate. The baffle plate 54 has its marginal portions defined by the upstanding flanges 56 whereby this main baffle plate 54 also serves as a pan. Fitting within the front of the baffle plate 54 is the lower end portion of an upstanding baffle plate 57. This plate 57 extends substantially entirely across the front of the baffle plate 54 and is of a height to terminate above the openings 52 in the side walls 16. This applied vertical baffle plate 57 is preferably of glass or other transparent material so that when the door 2 is opened, convenient visual access may be had within the shell or casing S to observe the air conditioning within the shell or casing. This baffle plate 57 is readily removed or applied when the door 2 is open. Positioned above each of the openings 55 is a pan 58 of such dimensions as to overlie the marginal portions of the plate 54 defining the openings 55. The corner portions of the pan 58 are provided with the depending legs 59 resting upon the plate 54 whereby the pan 58 is supported in required position and in desired elevation with respect to the baffle plate 54 and more particularly the opening 55 with which the pan 58 is associated.

The pan 58 is shallow, its depth, of course, being determined by the height of the upstanding side flanges 60. The upper marginal portions of these flanges 60 are provided with the spaced depressions 61. In practice, the low points of these depressions 61 are approximately one-quarter of an inch above the bottom of the pan and the depressions 61 allow the water collected within the pan 58 to overflow in small drops through the depressions 61. These drops allow water to be distributed through the air passing through an opening 55.

Extending through the side walls 16 below the plate 51 are the pipe lines 62 terminating in depending drip-heads 63, each of which being positioned above substantially the center of a pan 58. Each of these pipe lines 62 is in communication with a water coil W. Each of the pipe lines 62 has interposed therein a regulating valve 69 whereby means are provided to allow adjustment to be made in order to provide for so many drops per minute from a head 63.

The upper end portions of both of the coils 64 is in communication, as at 65, with a water line 66. The lines 65 and 66 are positioned within the top space 22 and extend a material distance over the box B. The line 66 is coupled, as at 67, to a pipe line 68 leading from a suitable source of water supply. This line 68, as herein disclosed, also extends within the shell or casing S through the rear wall 9 thereof.

Each of the coils 64 is in proper communication, as at 70, with the induction end of each of the coils W. Leading from the eduction ends of the coils W are the outlet pipes 71 delivering to a common pipe 72. This pipe 72 extends out from the shell or casing S through an adjacent side wall 4 and is provided at its outer end portion with a conventional faucet 73. Positioned below this faucet 73 is a holder 74 for a drinking glass or the like which is suitably secured to the adjacent side wall 4 of the shell or casing. Leading from this holder 74 is a drain line 75 which carries to a desired point of discharge.

It is believed to be obvious that the water circulating through the coils 64 and the coils W will be effectively cooled for drinking purposes. It is also to be pointed out that by having the pipe lines 62 in communication with the lower portions of the coils 64 a constant circulation of water through the coils 64 will be assured by the dropping of the water from the heads 63. This is of particular importance as by the maintenance of such circulation is substantially eliminated the liability of freezing of the water within the several coils which would otherwise have a tendency to clog the flow through the coils and thus render ineffective the drawing off of drinking water through the faucet 73.

As is particularly illustrated in Figure 2 of the drawings, each of the pans 58 is substantially horizontally disposed. The water overflowing the pan and falling upon the baffle plate 54, owing to the inclination of this plate 54, flows toward and out through the drain opening 76 and through the spout 77 discharging within a receptacle 78 carried by the upper end portion of a carry-off pipe 79. This receptacle 78 and the adjacent portion of the pipe 79 is within the food chamber C closely adjacent to the baffle plate 54 and also immediately adjacent to a side wall 4. The pipe 79 extends out through the adjacent side wall 4 and is in communication with the drain pipe 75, hereinbefore referred to.

The water collected upon the baffle plate 54 is prevented from flowing out through each of the openings 55 by providing in the upper surface of the plate 54 immediately adjacent the high end and along the sides of said opening 55, the troughs 95. The lower ends of the side troughs 95 discharge upon the lower portion of the top surface of the plate 54 so that the water draining therefrom may readily pass out through the opening 76.

It is believed to be readily apparent that as the air circulates within the food chamber C and through the various flues, the water delivered by the heads 63 upon the pans 58 will add moisture to the air at the upper portion of the food chamber. This is of advantage as such moisture will be more equally distributed. Furthermore, by having this extra moisture added to the air at the top portion of the chamber C an effective dispersement is effected of gases, odors, greasy filaments and the like, which may be carried by the circulating air.

It is also to be pointed out that the flues 21, 24 and 25, together with the top space 22, and particularly through the flues 21, will assure effective cooling of the water flowing through the coils 64. The air going up these flues 21 is the warmest and additional heat is provided by the relative warm water passing through the coils 64 whereby part of the moisture added to the circulating air at the top portion of the chamber C will be taken out. This will eliminate an excessive amount of moisture going to the various heat absorption coils. It is to be pointed out that when the heat absorption coils are lowered to a temperature below that within the space 22 and the flues in communication therewith, the air circulation is increased and thereby bringing down the gases, greasy filaments, etc.

In my apparatus, as hereinbefore described, it is further pointed out that during the period the heat coils are defrosting, the cake of ice within the box B, together with the ice columns depending therefrom, will hold the temperature within the shell or casing S to a minimum. The extra moisture is added to the circulating air because the temperature being controlled by the mechanical refrigerating unit will not permit the ice block and its columns to melt sufficiently to provide enough moisture to purify the air.

It is of particular advantage to have the baffle 57 removable in order to facilitate the placing of the pans 58 in desired position upon the plate 54 or to remove said pans for cleansing.

As is particularly illustrated in Figures 2 and 3 of the drawings, the lower portion of each of the side walls 16 of the box B is inwardly offset with respect to the upper portion of said side wall whereby is provided a thickened insulated portion 80 which extends above and below the water coils W. The inner face of this thickened portion 80 and above the coils W is disposed on an upward and outward incline, as at 81. This increased thickened portion 80 assures an air seal between the ice block within the box B and the portions of the walls 16 adjacent the grid. This is of advantage as otherwise air travelling through the openings or vents 52 would be permitted to travel upward thereby melting the sides of the ice as the ice block itself would be inefficient in excluding gases and odors. This increased thickened portion 80 is of further advantage as it provides such heat insulation to prevent a rapid melting of the ice before the block of ice has had time to melt down to produce the depending columns for contact with the plate 51.

It is also to be pointed out that the air as it circulates within the shell or casing S will pass between the ice columns depending from the ice block and in such travel between the ice blocks, foreign matter within the air, such as grease, bacteria and gases, will congeal upon the depending ice columns thereby assuring the air being thoroughly washed or freed of impurities. It is also believed apparent that the contact of the air with the depending ice columns with, of course, the lower face of the ice block proper, will allow the air as it returns to the food chamber C to carry off a certain amount of moisture.

In the embodiment of the invention as illustrated in Figures 7 and 8, the general construction of the apparatus is the same as hereinbefore described. The essential differences in this second embodiment of the invention over the first resides in the means for adding extra moisture to the circulating air within the upper portion of the food chamber D. Below the perforated plate 82 with which contact the ice columns depending from the ice block as it melts down through the grid G, is a baffle plate 83 which bridges the space between the side walls 84 of the box and which is arranged substantially in the same manner as the plate 51 hereinbefore referred to. This baffle plate 83 has close contact with the rear wall 85 of the shell or casing E and disposed downwardly and forwardly on a predetermined incline. This plate 83 terminates a desired distance short of the front end of the shell or casing E. This plate 83 may serve as a drain board for the liquid resulting from the melted ice and it can be readily removed for cleansing. It is preferred, however, to superimpose over this plate or board 83 a supplemental drain board 86. This board 86 has a gutter 87 or trough-like arrangement which is superimposed over the gutter 88 or the like at the forward low margin of the baffle plate or board 83. Both of these troughs 87 and 88 deliver to a suitable carry-off or drain pipe and preferably in a manner, as hereinbefore set forth, with respect to the spout 77 as comprised in the first embodiment of my invention.

Supported between the side walls 84 of the ice box in advance of the plate 82 is a vertically disposed front baffle 89. This baffle 89 extends a desired distance above and below the forward margin of the plate 82. The lower marginal portion of this baffle 89 is provided with a rearwardly and downwardly inclined baffle plate 90 which sheds the water received thereon upon the board 86 or upon the plate 83 when such board 86 is not in use. The plate or board 83 is within the upper portion of the food chamber D and said plate or board 83, together with the baffle plate 90, coact to provide what might be termed a split baffle and wherein the arrangement is such that the air in circulation within the shell or casing E will pass over the plate or board 83 or the applied supplemental plate 86 to allow the air to take up moisture from the water from the melting ice being drained off by the baffle plate or board 83 or the applied supplemental board 86 and the baffle plate 90. To add further moisture to the air at the upper portion of the food chamber D there is suitably supported above the lower forward marginal portions of the baffle plate or board 83, the suitably spaced and upwardly discharging spray nozzles 91. Each of these nozzles has in communication therewith a pipe line 92 leading from a water coil positioned within one of the side flues 93 in substantially the same manner and for the same purpose, as hereinbefore stated with respect to the drip head 63 as included in the first form of my refrigerating apparatus, hereinbefore described.

It is to be stated that the spray nozzles 91 are of a type to discharge a mist and it is important in practice that the mist be directed over the plate 83 toward the rear. For this purpose each of the spray nozzles 91 has disposed thereover a suitable deflector 94.

The receptacle 78, as is particularly illustrated in Figure 10, is supported upon a suitable bracket 96 and the spout 77 discharges within the receptacle 78 to one side of a central partition 97 intersecting the upper portion of the receptacle 78 by terminating above the bottom of said receptacle. The top portion of the receptacle 78 at the side remote from the spout 77 is closed by a removable lid 98 or the like.

Extending from below up within the receptacle 78 at the side of the partition 97 having the top 98 is an overflow pipe 99. This pipe 99 terminates a desired distance above the bottom of the receptacle 78 and the lower end portion of this pipe 99 discharges into the carry-off pipe 79. It is believed to be apparent that the receptacle 78 and the parts directly associated therewith provide a trap which seals the air against entering the interior of the shell or casing S up through the drain line 75 and pipe 79. The receptacle 78 and its associate parts are preferably made of glass or other transparent material so that it can be readily seen when the receptacle 78 requires cleaning.

As is particularly illustrated in Figure 1, it is to be noted that the front wall 20 and the sill 3 constitute an integral panel structure which is effectively held in position by the screws 100 or the like.

In the present embodiment of my invention, the connection of one of the pipe lines 62 is in direct connection with an outlet pipe 71 and the second pipe line 62 is in direct connection with its coil W at a point 101 (Figure 4) which will not allow continuous circulation through the front portion 12 of the grid. This, however, is of no disadvantage as the liability of freezing of the water in this front portion 12 is remote due to the fact that it is positioned quite a distance from the heat absorbing elements. I do not, however, wish to be understood as limiting myself to the particular points of connection of these pipe lines 62 with the coils W as such connections may be placed as preferred.

It is believed to be obvious that in lieu of the troughs 95, the margins of the openings 55 can be defined by upstanding flanges which will serve for the same purpose as the troughs.

It is also to be stated that a trough 95 or its equivalent upstanding flange may be disposed along the lower margin of each of the openings 55 to prevent water from dropping through said openings in the event the water collected on the plate 54 should be abnormal in quantity resulting from rapid melting of the ice.

From the foregoing description it is thought to be obvious that a refrigerating apparatus constructed in accordance with my invention is particularly well adapted for use by reason of the convenience and facility with which it may be assembled and operated.

I claim:

1. A refrigerator comprising, in combination, a case, an ice box within the upper portion of the case, the interior of the case below the ice box constituting a food chamber, a door in a wall of the case to allow access to the ice box, a door in the wall of the case to permit access to the food chamber, and a mechanical refrigerating unit including absorption elements within the case adjacent to the ice box, the doors of the case being associated with the same wall of the case, one of the absorption elements being positioned between said doors and another one of the elements being positioned to the rear of the ice box, both of said elements being connected in series.

2. A refrigerating apparatus comprising, in combination, a case, an ice box within the case, the walls of the ice box being spaced from the adjacent walls of the case to provide flues at the sides and to the rear of the ice box for air circulation, the front wall of the box having an opening to allow ice to be placed within the box, means for closing said opening, a door in the front wall of the box to allow access to the ice box, and a mechanical refrigerating unit including absorption elements one of which being in the flue to the rear of the ice box and another one of the absorption elements being positioned below the opening in the front wall of the ice box and below the door of the casing.

3. A refrigerating apparatus comprising, in combination, a case, an ice box within the case, the walls of the ice box being spaced from the adjacent walls of the case to provide flues for air circulation, the front wall of the box having an opening to allow ice to be placed within the box, means for closing said opening, a door in the front wall of the case to allow access to the ice box, and a mechanical refrigerating unit including absorption elements within certain of the flues, one of the absorption elements being positioned below the door of the casing, the means for closing the opening in the front wall of the ice box comprising a downwardly swinging door, said door for the ice box when in its lowered position extending out through the opening for the door of the casing to provide means to facilitate the placing of ice within the ice box.

4. A refrigerating apparatus comprising, in combination, a case, an ice box within the case, the walls of the ice box being spaced from the adjacent walls of the case to provide flues for air circulation, the front wall of the box having an opening to allow ice to be placed within the box, means for closing said opening, a door in the front wall of the box to allow access to the ice box, and a mechanical refrigerating unit including absorption elements within certain of the flues, one of the absorption elements being positioned below the opening in the front wall of the ice box and below the door of the casing, the side walls of the ice box being extended beyond the front and rear walls of the box to substantially bridge the space between the front and rear walls of the case.

5. A refrigerating apparatus, comprising in combination, a case, an ice box within the upper portion of the case and having its front, rear, side and top walls spaced from the corresponding walls of the case, the side walls of the box extending beyond the front and rear thereof and below the box, said side walls of the box substantially bridging the space between the front and rear walls of the case, a grid bottom for the box, said bottom providing means to form the lower portions of an ice block within the ice box into depending columns, and the side walls of the box below the grid being provided with air openings.

6. A refrigerating apparatus comprising, in combination, a case, an ice box within the upper portion of the case and having its front, rear, side and top walls spaced from the corresponding walls of the case, the side walls of the box extending beyond the front and rear thereof and below the box, said side walls of the box substantially bridging the space between the front and rear walls of the case, a grid bottom for the box, said bottom providing means to form the lower portions of an ice block within the ice box into depending columns, the side walls of the box below the grid being provided with air openings, a perforated plate supported by and between the depending portions of the side walls of the block below the air openings through said side walls, said plate being contacted by the depending columns of the ice block as the same melt down through the grid, and draining means positioned below the plate for carrying off the liquid resulting from the melted ice.

7. A refrigerating apparatus, comprising in combination, a case, an ice box within the upper portion of the case and having its front, rear, side and top walls spaced from the corresponding walls of the case, the side walls of the box extending beyond the front and rear thereof and below the box, said side walls of the box substantially bridging the space between the front and rear walls of the case, a grid bottom for the box, said bottom providing means to form the lower portions of an ice block within the ice box into depending columns, the side walls of the box below the grid being provided with air openings, a perforated plate supported by and between the depending portions of the side walls of the block below the air openings through said side walls, said plate being contacted by the depending columns of the ice block as the same melt down through the grid, draining means positioned below the plate for carrying off the liquid resulting from the melted ice, and means for delivering moisture between the depending portions of the side walls of the box at a point below the openings therein, said means being independent of the moisture provided by the melting ice.

8. A refrigerating apparatus comprising, in combination, a case, a horizontally disposed grid supported within the upper portion of the case, said grid constituting a bottom for an ice chamber, a draining baffle positioned below the grid, said baffle having a relatively large opening through which air circulates, a pan supported to overlie the opening in the drain baffle, and means for delivering water within the pan to add moisture to the air.

9. A refrigerating apparatus comprising, in combination, a case, a horizontally disposed grid supported within the upper portion of the case, said grid constituting a bottom for an ice chamber, a draining baffle positioned below the grid, said baffle having a relatively large opening through which air circulates, a pan supported to overlie the opening in the drain baffle, and means for delivering water within the pan to add moisture to the air, the upper margin of the pan being provided at spaced points therearound with depressions to provide means to allow the water within the pan to overflow in drops upon the draining baffle.

10. A refrigerating apparatus comprising, in combination, a case, a horizontally disposed grid supported within the upper portion of the case, said grid constituting a bottom for an ice chamber, a draining baffle positioned below the grid, a spray nozzle positioned above said draining baffle for adding moisture to the air, said nozzle being at the forward portion of the drain baffle, and a deflector disposed over the nozzle to direct rearwardly the discharge from the nozzle.

ARTHUR J. PEDIGO.